United States Patent
Haegeman

[19]

[11] Patent Number: 5,961,212

[45] Date of Patent: Oct. 5, 1999

[54] SCREW WITH CONTINUOUS AND DISCONTINUOUS BLADES FOR WATER PROCESSING APPARATUS

[75] Inventor: Johny Hector Haegeman, Halle, Belgium

[73] Assignee: Aquasystems International N.V., Belgium

[21] Appl. No.: 08/793,366

[22] PCT Filed: Aug. 23, 1995

[86] PCT No.: PCT/BE95/00077

§ 371 Date: Feb. 24, 1997

§ 102(e) Date: Feb. 24, 1997

[87] PCT Pub. No.: WO96/06050

PCT Pub. Date: Feb. 29, 1996

[30] Foreign Application Priority Data

Aug. 24, 1994 [BE] Belgium .................................. 9400765

[51] Int. Cl.⁶ ....................................................... B01F 5/12
[52] U.S. Cl. ............................................ 366/266; 366/322
[58] Field of Search ..................................... 366/266, 319, 366/322; 198/657, 662, 664, 676; 415/71–75; 416/176; 417/61

[56] References Cited

U.S. PATENT DOCUMENTS

| | | | |
|---|---|---|---|
| 1,524,605 | 1/1925 | White | 366/266 |
| 1,696,994 | 1/1929 | White | 366/266 |
| 3,076,637 | 2/1963 | Moziek et al. | 366/322 X |
| 3,323,570 | 6/1967 | Tullock et al. | 366/322 X |
| 3,421,740 | 1/1969 | Behrens | 366/322 X |
| 3,856,272 | 12/1974 | Ravitts | 366/266 X |
| 4,123,226 | 10/1978 | Vanderveen | 366/322 X |
| 4,193,696 | 3/1980 | Van Heel et al. | 366/322 X |
| 4,202,636 | 5/1980 | Vanderveen | 366/319 |
| 4,223,996 | 9/1980 | Mathis et al. | 366/322 X |
| 4,628,803 | 12/1986 | Bonora et al. | 366/319 X |
| 4,761,076 | 8/1988 | Witcombe | 366/322 X |

FOREIGN PATENT DOCUMENTS

| | | | |
|---|---|---|---|
| A0 366 644 | 5/1990 | European Pat. Off. . | |
| 2489293 | 3/1982 | France . | |
| 424724 | 9/1974 | U.S.S.R. | 366/266 |
| 909315 | 2/1982 | U.S.S.R. | 415/73 |
| 2491158 | 4/1982 | U.S.S.R. | 415/73 |
| 2049 457 | 12/1980 | United Kingdom . | |

*Primary Examiner*—Charles E. Cooley
*Attorney, Agent, or Firm*—Hall Priddy & Myers

[57] ABSTRACT

A water treatment apparatus comprising a power source driving a shaft supporting a helicoidal, spiral-shaped screw having an upper end part and a lower end part and fitted round at least part of the shaft, such that water is sucked up or impelled downwards, the screw comprising at least one continuous screw blade, and at least one discontinuous screw blade near at least one of its end parts.

7 Claims, 3 Drawing Sheets

SCREW WITH CONTINUOUS AND DISCONTINUOUS BLADES FOR WATER PROCESSING APPARATUS

BACKGROUND OF THE INVENTION

This invention concerns a screw for apparatuses used for water purification installations, such as aerators or mixers, and more particularly for apparatuses of the type in which a source of power, which may or may not be mounted on a float, drives a shaft on which a screw (impeller device) is fitted. In aerators the water is sucked up, deflected and spread more or less horizontally over the surface of the water. In mixers the water is sucked in and impelled down under the surface of the liquid.

The state of the art impeller device (Belgian patent 884.216) consists of two parts, namely a lower part formed by a screw and an upper part formed by a paddle wheel.

This embodiment was improved by the Belgian patent 893.687 by converting the screw and the paddle wheel to a single body in which the screw is gradually curved in the form of a spiral and merges into the paddles of the paddle wheel. In this way, a screw pump is formed, consisting of one single body in the form of a centrifugal screw propeller.

This screw pump can serve either as an aerator or as a mixer, and can even be combined as a mixer/aerator as described in European patent 366.644.

Such a screw pump can be single-stage (with one helicoidal, spiral-shaped screw blade) but can also be multistage (with several helicoidal, spiral-shaped screw blades). It is clear that a multistage screw involves more frictional losses and causes more turbulence in the flow of water sucked up or sucked in. A multistage pump also demands a greater capacity on the part of the power source. If a single-stage pump is used, the frictional losses and turbulence are reduced, and a power source with lower capacity is sufficient, but the water flow rate is also reduced.

SUMMARY OF THE INVENTION

The aim of this invention is to offer a screw that combines the advantages of both the multistage and the single-stage pump, while avoiding the disadvantages of the multistage and single-stage pump.

According to the invention, the screw has a helicoidal, spiral shaped form and consists of at least one continuous screw blade and at least one extra, discontinuous screw blade located near the upper and/or lower end part of the screw.

In the description and claims hereunder, one should understand by continuous screw blade, a screw blade starting at the upper part of the screw and continuing until the lower part of the screw; by discontinuous screw blade, a screw blade fitted exclusively round an end part of the screw (upper and/or lower end part).

According to an advantageous embodiment, the screw has two blades at the bottom, with one blade continuing through to the upper end part.

According to another embodiment, the screw has two blades below, with one blade continuing to near the top end part, which in turn has two blades.

It is clear that a screw pump with for example two continuous blades and with four blades in the lower and/or upper end part can also be used according to the invention.

In this way, the flow rate of the water stream can be increased by the presence of additional blades on the intake side of the pump, while on the other hand the frictional losses and turbulence can be kept low because the water only passes through one blade. Such a screw pump accordingly only requires a small capacity from the power source for a high flow rate.

In the case of aerators, by increasing the number of blades near the upper end part, the effect of the centrifugal force of the screw is increased, and the output speed and distribution of the water current are improved, thus increasing the area of contact with the air.

In the case where the apparatus is used as a mixer, better suction is improved by the extra screw blades above and/or the impeller force is increased by extra screw blades below.

According to an advantageous embodiment, the screw consists of a cylinder-shaped shaft driven by a motor, said shaft having on the motor side a more or less trumpet-shaped deflector body curving towards the outside. A screw with a helicoidal, spiral-shaped motion is mounted at least partly round this shaft. A good pump effect or impeller force is obtained when the outside diameter of said screw starts from zero near the lower end of the shaft and gradually increases.

The screw can consist of one screw blade (single-stage) or of several screw blades (multistage), with the speed and the diameter in each case being either constant or variable. On the lower part of the shaft, up to a limited height, are mounted one or more extra screw blades, and several extra screw blades are mounted in, near or under the deflector body as necessary. According to a preferred embodiment, the form of the screw blades can be lightly curved upwards on the outside, thus increasing the pump effect.

BRIEF DESCRIPTION OF THE DRAWINGS

The invention is described below in greater detail on the basis of several non-limitative examples, with reference to the attached drawings, where.

DESCRIPTION OF THE PREFERRED EMBODIMENTS

Figure 1:
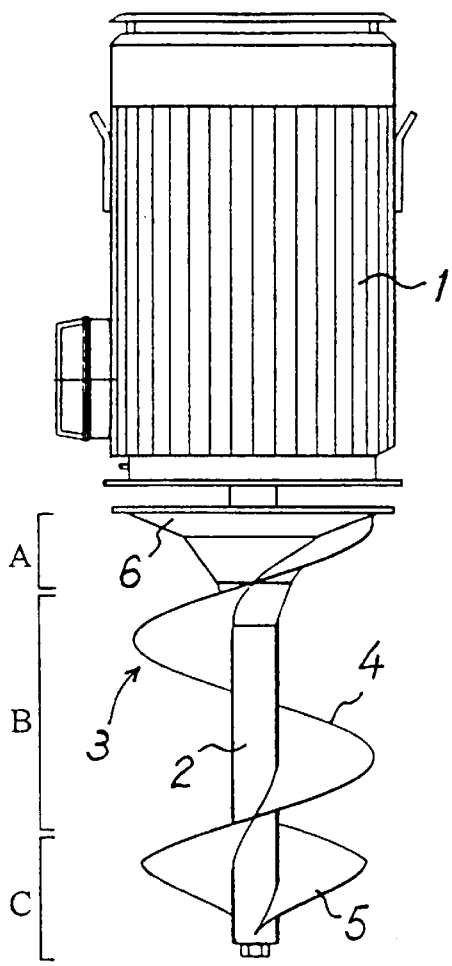
FIG. 1 shows an embodiment of the water processing device of the present invention having a screw with two blades, one of the blades terminating after a spiral shaped motion of approximately 180.

FIG. 1 shows a surface aerator which can also be used as a mixer, consisting of a motor 1 which drives a shaft 2.

Said shaft 2 broadens on the upper side, forming a deflecting body 6 which curves outward. Round the shaft 2 is mounted a screw 3. Said screw consists of a blade 4 which starts from the bottom of the shaft and, following a helicoidal, spiral-shaped motion, terminates in the deflecting body 6. A second screw blade 5 is also mounted at the bottom of the shaft; said second screw blade 5 however terminates after a spiral-shaped motion of approximately 180°. Starting from the lower most part of the continuous screw blade 4, blade 4 is wound in a direction toward the top of shaft 2. Starting from the lower most part of discontinuous blade 5, blade 5 is wound in a direction toward the top of shaft 2, wherein said continuous and discontinuous blades are wound in a common direction.

The screw therefore consists of two blades below, so achieving a good pump effect, but with one blade being very limited, so that little frictional losses and turbulence occur.

Figure 2:
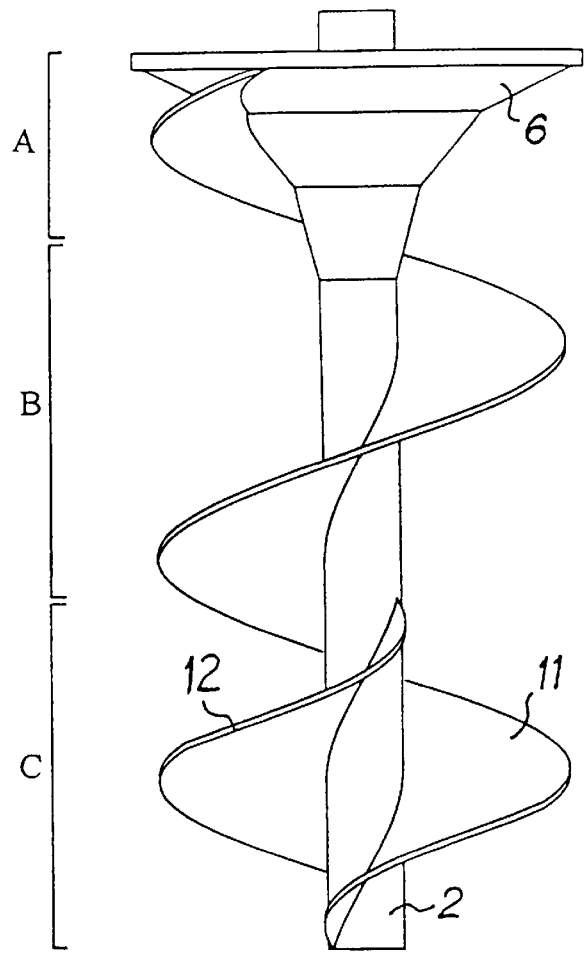
FIG. 2 shows an embodiment of the screw of the present invention having two blades, one of the blades terminating after a spiral shaped motion of approximately 270°.

For the sake of simplicity, FIGS. 2 through 5 only show the screw around the shaft 2, where in FIG. 2 an upper end part A, a middle part B and a lower end part C can be distinguished. According to FIG. 2, one screw blade 11 starts in the lower end part with a diameter varying from the shaft diameter to the full diameter, and continues with constant diameter into the deflecting body 6. An extra screw blade 12 is mounted in the lower end part C, also starting from the bottom of the shaft 2, but terminates after a spiral-shaped motion of 270° or so. Starting from the lower most part of the continuous screw blade 11, blade 11 is wound in a direction toward the top of shaft 2. Starting from the lower most part of discontinuous blade 12, blade 12 is wound in a direction toward the top of shaft 2, wherein said continuous and discontinuous blades are wound in a common direction.

Figure 3:
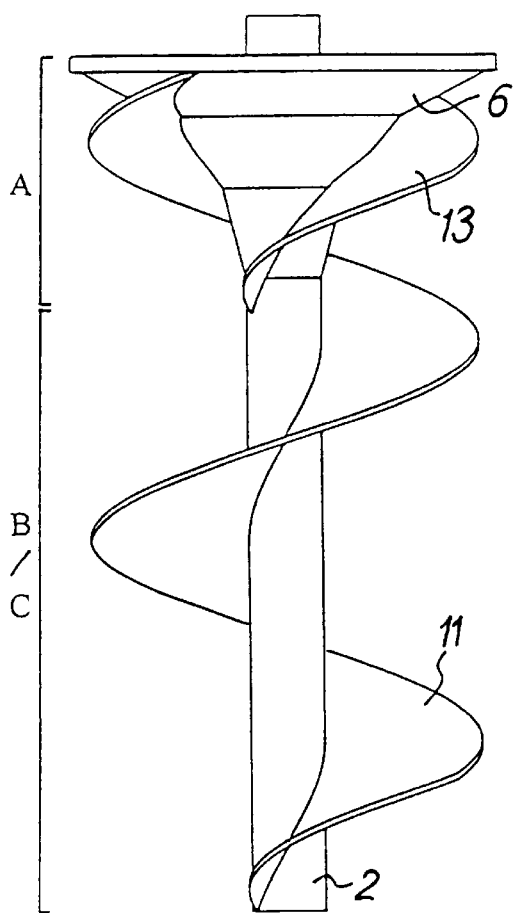
FIG. 3 shows an embodiment of the screw of the present invention having three blades, one of the blades terminating after a spiral shaped motion of approximately 270, and another blade in the upper end part.

FIG. 3 shows a variant of FIG. 2 with a continuous screw blade 11 and an extra screw blade 13 in the upper end part A. Starting from the lower most part of the continuous screw blade 11, blade 11 is wound in a direction toward the top of shaft 2. Starting from the lower most part of blade 13, blade 13 is wound in a direction toward the top of shaft 2, wherein continuous blade 11 and discontinuous blade 13 are wound in a common direction.

Figure 4:
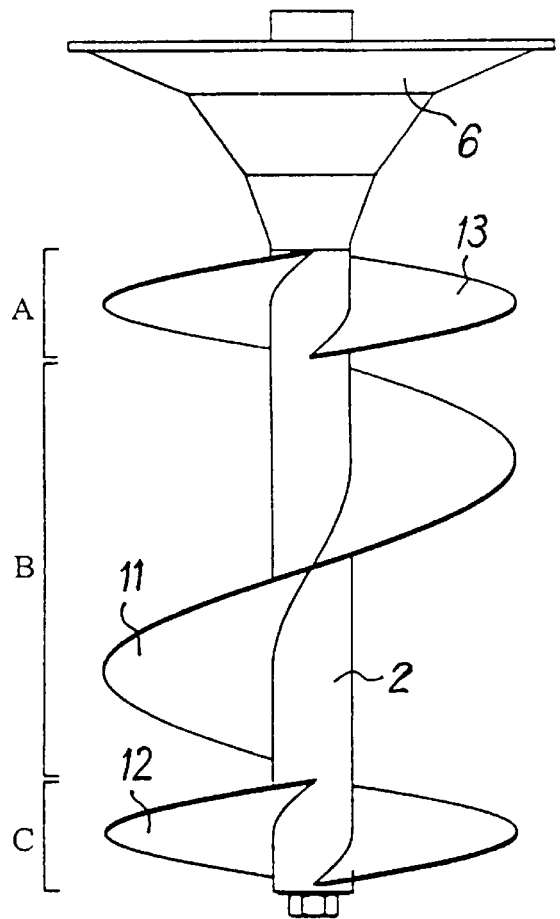
FIG. 4 shows an embodiment of the screw of the present invention having three blades, one continuous screw blade, one blade at the lower end part and one at the upper end part.

FIG. 4 shows a combination of FIGS. 2 and 3, with a continuous screw blade 11 and an extra screw blade 12 in end part C and another extra screw blade 13 in end part A. In this example, however, the screws 11 and 13 terminate underneath the deflecting body 6, so that the upper end part A is situated lower. Starting from the lower most part of the continuous screw blade 11, blade 11 is wound in a direction toward the top of screw 2. Starting from the lower most part of discontinuous blades 12 and 13, blades 12 and 13 are wound in a direction toward the top of screw 2, wherein said continuous and discontinuous blades are wound in a common direction.

Figure 5:
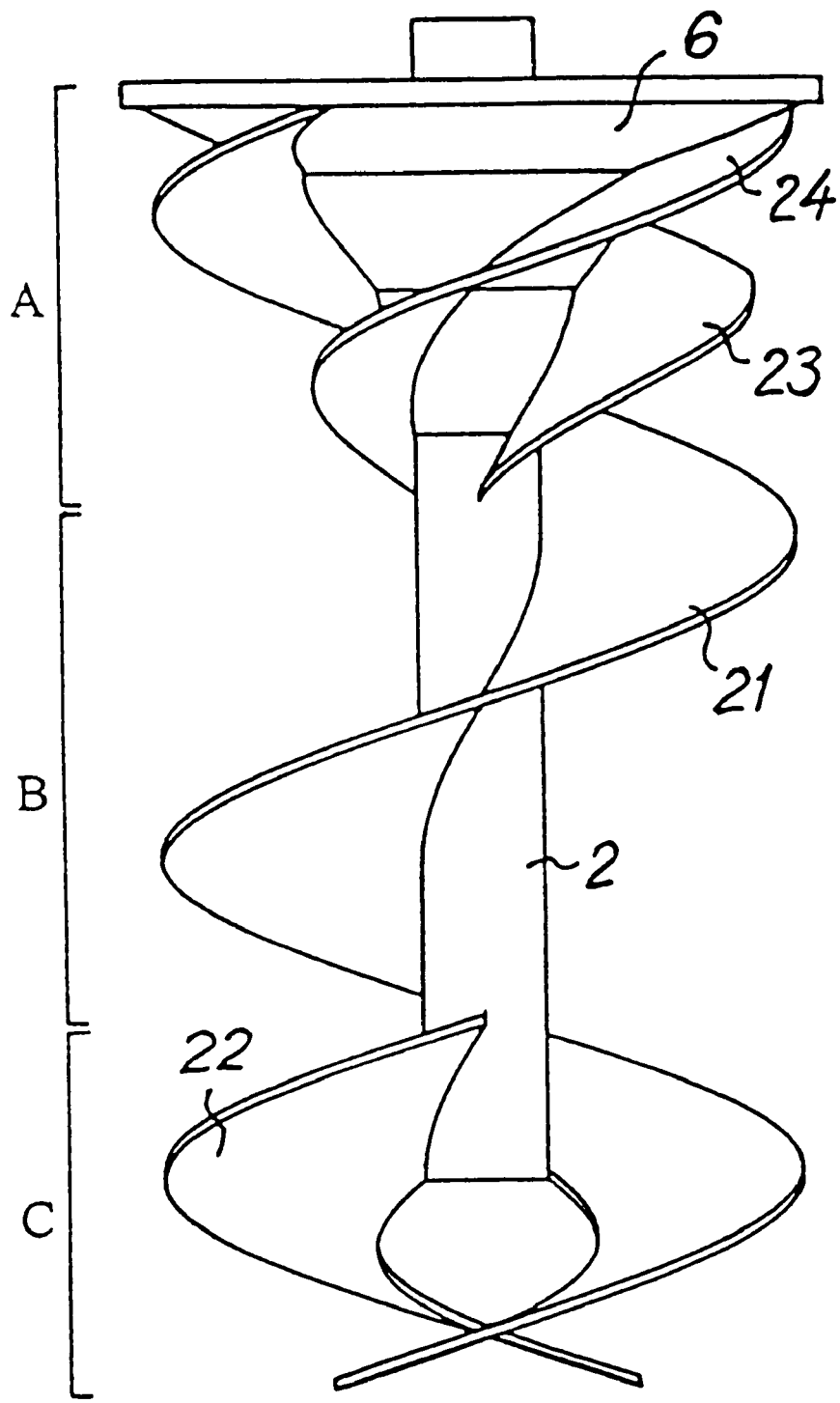
FIG. 5 shows an embodiment of the screw of the present invention having four blades, one continuous screw blade, two blades at the lower end part and one at the upper end part.

FIG. 5 shows a variant of FIG. 4, in which a continuous screw blade 21 has a constant diameter and starts below the shaft 2. In this alternative embodiment there is an extra screw blade 22 in the end part C and there are two extra screw blades 23 and 24 in the upper end part A. Starting from the lower most part of the continuous screw blade 21, blade 21 is wound in a direction toward the top of shaft 2. Starting from the lower most part of discontinuous blades 22, 23 and 24, blades 22, 23 and 24 are wound in a direction toward the top of shaft 2, wherein said continuous and discontinuous blades are wound in a common direction.

In the above examples, the discontinuous screw blades terminate after about 90°, 180°, 270° or 360°, but it is clear that there is no restriction on the execution of these screw blades, and that it can also terminate after one quarter of a revolution or can make any other fraction of a revolution or any number of revolutions. It is up to the person skilled in the art to determine which length a screw blade should have.

The examples show embodiments which for the sake of simplicity are shown round the same shaft of the same apparatus. The invention is not limited to these embodiments, but can be applied on all aerators and mixers which comprise a propeller or screw which pumps the water up towards the surface or impels it downwards.

The invention claimed is:

1. A water treatment apparatus comprising a power source;

a shaft driven by said power source; and a spiral-shaped screw supported on said shaft;

said screw having a length extending from an upper end part of said screw to a lower end part of said screw and being fitted around at least part of said shaft such that water is sucked up or impelled downwards;

said screw comprising one or more continuous screw blades extending over the length of said screw, and one or more discontinuous screw blades located within the length of said screw and near said upper end part or said lower end part, wherein said continuous and discontinuous screw blades are wound in a common direction.

2. The water treatment apparatus according to claim 1 wherein one of said one or more discontinuous screw blades is near the lower end part.

3. The water treatment apparatus according to claim 2 wherein a second of said one or more discontinuous screw blades is near the upper end part.

4. The water treatment apparatus according to claim 1 wherein one of said one or more discontinuous screw blade is near the upper end part.

5. The water treatment apparatus according to claim 1 wherein said one or more continuous screw blades and said one or more discontinuous screw blades are lightly curved upwards near an outside edge of each of said continuous and discontinuous screw blades.

6. A surface aerator apparatus comprising:

a power source;

a shaft driven by said power source; and a spiral-shaped screw supported on said shaft;

said screw having a length extending from an upper end part of said screw to a lower end part of said screw and being fitted around at least part of said shaft such that water is sucked up;

said screw comprising one or more continuous screw blades extending over the length of said screw, and one or more discontinuous screw blades located within the length of said screw and near said upper end part or said lower end part, wherein said continuous and discontinuous screw blades are wound in a common direction.

7. A water mixer apparatus comprising:

a power source;

a shaft driven by said power source; and a spiral-shaped screw supported on said shaft;

said screw having a length extending from an upper end part of said screw to a lower end part of said screw and being fitted around at least part of said shaft such that water is impelled downwards;

said screw comprising at least one continuous screw blade extending over the length of said screw, and at least one discontinuous screw blade located within the length of said screw and near said upper end part or said lower end part, wherein said continuous and discontinuous screw blades are wound in a common direction.

* * * * *